United States Patent
Bayon et al.

(10) Patent No.: US 9,790,924 B2
(45) Date of Patent: Oct. 17, 2017

(54) WIND TURBINE CONTROL AND MONITORING METHOD USING A WIND SPEED ESTIMATION BASED ON A LIDAR SENSOR

(71) Applicant: IFP Energies nouvelles, Rueil-Malmaison (FR)

(72) Inventors: Benoit Bayon, Gleize (FR); Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 285 days.

(21) Appl. No.: 14/552,981

(22) Filed: Nov. 25, 2014

(65) Prior Publication Data

US 2015/0145253 A1     May 28, 2015

(30) Foreign Application Priority Data

Nov. 25, 2013   (FR) ..................................... 13 61600

(51) Int. Cl.
| | |
|---|---|
| F03D 11/00 | (2006.01) |
| F03D 9/00 | (2016.01) |
| H02P 9/00 | (2006.01) |
| F03D 7/04 | (2006.01) |
| F03D 80/80 | (2016.01) |
| F03D 17/00 | (2016.01) |
| F03D 9/25 | (2016.01) |

(52) U.S. Cl.
CPC .......... *F03D 11/0091* (2013.01); *F03D 7/043* (2013.01); *F03D 9/25* (2016.05);
(Continued)

(58) Field of Classification Search
CPC ...... F03D 7/043; F03D 9/002; F03D 11/0091; F03D 17/00; F03D 80/82; F05B 2260/821;
(Continued)

(56) References Cited

U.S. PATENT DOCUMENTS

| | | | |
|---|---|---|---|
| 6,320,272 B1 * | 11/2001 | Lading | F03D 7/0224 290/44 |
| 7,342,323 B2 * | 3/2008 | Avagliano | F03D 7/0224 290/44 |
| 2009/0047116 A1 * | 2/2009 | Barbu | F03D 1/008 415/1 |
| 2009/0099702 A1 * | 4/2009 | Vyas | F03D 7/0292 700/287 |

(Continued)

FOREIGN PATENT DOCUMENTS

| | | |
|---|---|---|
| EP | 2 581 761 A1 | 4/2013 |
| FR | 2 976 630 A1 | 12/2012 |

OTHER PUBLICATIONS

Laks, Jason, et al: "A Spectral Model for Evaluating the Effect of Wind Evolution on Wind Turbine Preview Control," 2013 American Control Conference, IEEE, Jun. 17, 2013 (Jun. 17, 2013), pp. 3673-3679, XP032476148, ISSN: 0743-1619, ISBN: 978-1-4799-0177-7.

(Continued)

*Primary Examiner* — Igor Kershteyn
(74) *Attorney, Agent, or Firm* — Fitch, Even, Tabin & Flannery LLP

(57) ABSTRACT

The invention is a method for controlling and/or monitoring a wind turbine 1 equipped with a LIDAR sensor 2. Control and/or monitoring provides an estimation of the wind speed at the rotor obtained an estimator and a LIDAR sensor 2. The estimator of the wind speed at the rotor is constructed from a representation of the wind, a model of the LIDAR sensor and a model of wind propagation.

27 Claims, 7 Drawing Sheets

(52) U.S. Cl.
CPC ............ *F03D 17/00* (2016.05); *F03D 80/82* (2016.05); *H02P 9/008* (2013.01); *F05B 2260/821* (2013.01); *F05B 2270/32* (2013.01); *F05B 2270/8042* (2013.01); *Y02E 10/723* (2013.01)

(58) Field of Classification Search
CPC .......... F05B 2270/32; F05B 2270/8042; H02P 9/008; Y02E 10/723
See application file for complete search history.

(56) References Cited

U.S. PATENT DOCUMENTS

| | | | |
|---|---|---|---|
| 2010/0135789 A1* | 6/2010 | Zheng | F03D 7/0224 416/1 |
| 2012/0179376 A1 | 7/2012 | O'Brien et al. | |
| 2012/0321463 A1 | 12/2012 | Chauvin et al. | |
| 2013/0094961 A1* | 4/2013 | Couchman | F03D 7/042 416/1 |

OTHER PUBLICATIONS

Schlipf, David, et al: "Comparison of Feedforward and Model Predictive Control of Wind Turbines Using LIDAIR," Decision and Control (CDC), 2012 IEEE 51st Annual Conference on, IEEE, Dec. 10, 2012 (Dec. 10, 2012), pp. 3050-3055, XP032323824, DOI: 10.1109/CDC.2012.6426063, ISBN: 978-1-4673-2065-8.

* cited by examiner

WIND TURBINE CONTROL AND MONITORING METHOD USING A WIND SPEED ESTIMATION BASED ON A LIDAR SENSOR

CROSS REFERENCE TO RELATED APPLICATION

Reference is made to French Patent Application Serial No. 13/61.600, filed on Nov. 25, 2013, which application is incorporated herein by reference in its entirety.

BACKGROUND OF THE INVENTION

Field of the Invention

The present invention relates to the field of renewable energy and more particularly, to the measurement of the parameters of the wind turbines, that is the wind speed and turbine control objectives of orientation, torque and speed regulation.

Description of the Prior Art

A wind turbine allows the kinetic energy from the wind to be converted into electrical or mechanical energy. For conversion of the energy from the wind to electrical energy, the wind turbine includes the following elements:

(a) A tower positioning a rotor at a sufficient height to enable motion thereof (necessary for horizontal-axis wind turbines) or for the rotor to be positioned at a height enabling the turbine to be driven by a stronger and more regular wind than at ground level. The tower generally houses part of the electrical and electronic components (modulator, control, multiplier, generator, etc.);

(b) A nacelle mounted at the top of the tower which houses mechanical, pneumatic and some electrical and electronic components which are necessary to operate the machine. The nacelle can rotate to adjust the machine to the right direction to be driven by the wind;

(c) A rotor fastened to the nacelle comprising several blades (generally three) and the nose of the wind turbine. The rotor is driven by wind power and it is connected by a mechanical shaft, directly or indirectly (via a gearbox and mechanical shaft system), to an electrical machine (electrical generator) that converts the recovered energy into electrical energy. The rotor may be provided with control systems such as variable-angle blades or aerodynamic brakes; and (d) A transmission having two shafts (mechanical shaft of the rotor and mechanical shaft of the electric machine) connected by a transmission (gearbox).

Since the beginning of the 1990s, renewed interest has occurred in wind power, in particular in the European Union where the annual growth rate is about 20%. This growth is attributed to obtaining carbon-emission-free electricity generation. In order to sustain this growth, the energy yield of wind turbines has to be improved. The prospect of wind power production increase requires developing effective production tools and advanced control tools in order to improve the performances of the machines. Wind turbines are designed to produce electricity at the lowest possible cost. They are therefore generally built to reach their maximum performance at a wind speed of approximately 15 m/s. It is not necessary to design wind turbines that maximize their yield at higher wind speeds, which are not common. In case of wind speeds above 15 m/s, part of the additional energy contained in the wind is lost to avoid damage to the wind turbine. All wind turbines are therefore designed with a power regulation system.

For this power regulation, controllers have been designed for variable-speed wind turbines. The purpose of the controllers is to maximize the electrical power which is recovered, to minimize the rotor speed fluctuations and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimating a wind speed at one point, but this imprecise technology does not enable measurement of an entire wind field or to know the three-dimensional components of the wind speed.

According to a second technique, a LIDAR (Light Detection And Ranging) sensor can be used. LIDAR is a remote sensing or optical measurement technology based on the analysis of the properties of a beam returned toward the transmitter. This method is notably used for determining the distance to an object by means of a pulse laser. Unlike radars based on a similar principle, LIDAR sensors use visible or infrared light instead of radio waves. The distance to an object or a surface is given by the measurement of the delay between the pulse and the detection of the reflected signal.

In the field of wind turbines, LIDAR sensors are described as essential for proper functioning of large wind turbines, especially now that their size and power increases (today 5 MW, soon 10 MW). This sensor allows remote wind measurements which first allow wind turbines to be calibrated so that they can deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it allows knowing the energy generating resource. This is important for wind turbine projects since it conditions the financial viability of the project.

A second application sets the sensor on the nacelle of the wind turbine for measuring the wind field in front of the turbine while being nearly horizontally oriented. A priori, measuring the wind field in front of the turbine allows knowing in advance the turbulence the wind turbine is going to encounter. However, current wind turbine control and monitoring techniques do not allow measurement performed by a LIDAR sensor for estimating precisely the speed of the wind at the rotor.

SUMMARY OF THE INVENTION

The invention relates to a method for at least one of controlling and/or monitoring a wind turbine, and at least one of controlling and monitoring providing an estimation of the wind speed at the rotor obtained using an estimator and a LIDAR sensor. The estimator of the wind speed at the rotor is constructed from a representation of the wind, a model of the LIDAR sensor and a wind propagation model. The invention permits knowing and estimating in advance the three-dimensional components of the wind at the rotor.

The invention also relates to a method for at least one controlling and/or monitoring a wind turbine equipped with a LIDAR sensor performing a measurement relative to the wind at a point located upstream from the wind turbine. The method comprises:

a) acquiring a signal representing measurement by the LIDAR sensor;
b) constructing an estimator of the wind at the rotor of the turbine using a representation of the wind, a model of the LIDAR sensor and a wind propagation model with the estimator of the wind at the rotor relating the signal to wind speed at the rotor;
c) estimating the wind speed at the rotor of the turbine by applying the acquired signal to the estimator of the wind at the rotor; and
d) at least one controlling and monitoring the wind turbine by using the estimated wind speed.

According to one embodiment of the invention, the wind turbine is controlled by at least one of controlling an angle of inclination of the blades of the turbine and the electrical recovery torque of a generator of the turbine.

According to an embodiment of the invention, monitoring the electrical recovery torque of a generator of the wind turbine is performed as a function of the estimated wind speed.

Advantageously, the wind representation is a frequency model expressed as a Von Karman spectrum.

Preferably, the wind representation may be known beforehand, determined in real time or determined arbitrarily.

Advantageously, the model of the LIDAR sensor depends on at least one measuring angle ($\theta$, $\phi$) of the LIDAR sensor and on a volume characteristic of the LIDAR sensor.

According to an aspect of the invention, the model of the LIDAR sensor M(v) is written in the frequency domain by a relation as follows:

$$M(v) = e^{2i\pi v \frac{l_0 \sin(\phi)}{\overline{w}}} L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix}$$

with L(v) being the Fourier transform of the function $$\overline{f}\left(\tau - \frac{l_0\sin(\phi)}{\overline{w}}\right) \text{ and}$$

$$\overline{f}\left(\tau - \frac{l_0\sin(\phi)}{\overline{w}}\right) = \frac{K\sin^2(\phi)}{(\tau\overline{w})^2\Gamma^2},$$

$$\tau = \frac{l\sin(\phi)}{\overline{w}},$$

$l_0$ being the focal length of the LIDAR sensor, I being the measuring distance, $\theta$ and $\phi$ being the orientation angles of the LIDAR sensor, $\overline{w}$ being the average wind speed, $\Gamma$ being the Rayleigh constant, K being a regulation factor, and $W_x$, $W_y$, $W_z$ being components of the wind speed at the measuring point.

According to an aspect of the invention, the frequency response of said estimator of the wind at the rotor F(v) is written by a relation as follows:

$$F(v) = e^{-2i\pi v \frac{l_0\sin(\phi)}{\overline{w}}} W_l(v) M_R(v) (M_R(v) M_R^T(v) + \alpha^2)^{-1} \text{ with}$$

$$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix},$$

$W_l(v)=[W_x(v)\ 0\ 0]$, L(v) being the Fourier transform of function $$\overline{f}\left(\tau - \frac{l_0\sin(\phi)}{\overline{w}}\right) \text{ and}$$

$$\overline{f}\left(\tau - \frac{l_0\sin(\phi)}{\overline{w}}\right) = \frac{K\sin^2(\phi)}{(\tau\overline{w})^2\Gamma^2},$$

$$\tau = \frac{l\sin(\phi)}{\overline{w}},$$

$l_0$ being the focal length of the LIDAR sensor, I being the measuring distance, $\theta$ and $\phi$ being the orientation angles of the LIDAR sensor, $\overline{w}$ being the average wind speed, r being the Rayleigh constant, K being a regulation factor, $W_x$, $W_y$, $W_z$ being the components of the wind speed at the measuring point and $\alpha$ being a regularization parameter.

Furthermore, the estimator of the wind at the rotor can be constructed using a windowing method applied to the frequency response of the estimator of the wind at the rotor.

According to the invention, the wind propagation model is constructed according to at least one of the following hypotheses:
The wind vector is the same on vertical planes perpendicular to the wind direction and
the wind turbulence propagates at the average wind speed.

The invention furthermore relates to a wind turbine, notably an offshore wind turbine, equipped with a LIDAR sensor whose measuring point is located upstream from the turbine. The wind turbine comprises a control implementing the wind turbine control method as described above.

Advantageously, the LIDAR sensor is arranged on the nacelle of the wind turbine.

BRIEF DESCRIPTION OF THE DRAWINGS

Other features and advantages of the method according to the invention are clear from reading the description hereafter of embodiments given by way of non limitative example, with reference to the accompanying figures wherein.

DETAILED DESCRIPTION OF THE INVENTION

The invention relates to a method for at least one of controlling and/or monitoring an onshore or offshore horizontal-axis wind turbine, wherein the wind turbine is at least one of controlled and monitored according to an estimation of the wind speed at the rotor and the turbine is equipped with a LIDAR sensor for the estimation.

Notations

In the description hereafter, the following notations are used:
- x, y, z are directions of the three-dimensional reference frame, with z being the vertical axis and x being the principal wind direction,
- w is a wind speed vector, with $w_x$, $w_y$, $w_z$ being the wind components on the three-dimensional frame, $\overline{w}$ being the average wind speed and $W_x$, $W_y$, $W_z$ being the spectrum of the speed vector components,
- $L_v$ is wavelength;
- $\sigma_x$ is a scaling factor;
- $l_0$ is a focal length of the LIDAR sensor;
- $\vec{l}$ is a vector of the axis of the LIDAR sensor connecting the LIDAR sensor and the measuring point $$\vec{l} = \frac{\vec{OP_M}}{\|\vec{OP_M}\|}$$

with O being the origin (location of the LIDAR sensor), and $P_M$ being the measuring point, and the measuring distance of the LIDAR sensor is denoted by I;
- θ and φ are orientation angles of the LIDAR sensor. These angles are explained with angle θ being the angle formed by the projection of axis (A) of the LIDAR sensor in the plane (y, z), and φ being the angle formed by the projection of axis (A) of the LIDAR sensor in a plane containing the axis x and of the projection of axis (A) of the LIDAR sensor in plane (y, z);
- Γ is a Rayleigh constant that can be estimated at 1570;
- K is a regulation factor;
- m(t) is the LIDAR sensor measurement;
- α is an estimator adjustment parameter that can be seen as the confidence in the measurement, or the standard deviation of the measuring noise. This parameter is also referred to as regularization parameter,
- τ is a delay representative of the time of propagation of the wind vector between the measuring point and the rotor plane.

The invention relates to a method of estimating the wind on the rotor of a wind turbine equipped with a LIDAR sensor. The LIDAR sensor performs a measurement relative to the wind at one measuring point located in front of the wind turbine.

Figure 2:
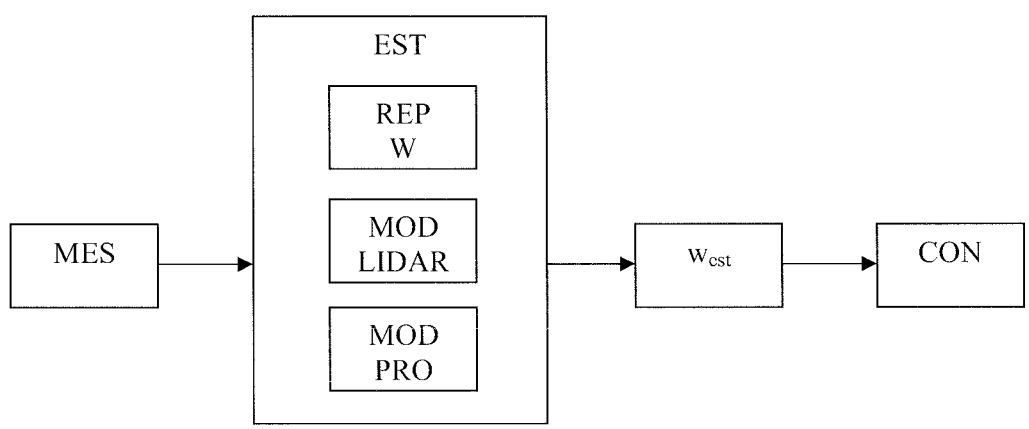
FIG. 2 illustrates the various stages of the method according to the invention.

FIG. 2 shows the various stages of the method according to the invention:
1. Acquisition of the measuring signal (MES)
2. Construction of the estimator of the wind at the rotor (EST)
3. Estimation of the wind at the rotor (West)
4. Control and/or monitoring of the wind turbine (CON).

The method according to the invention allows reconstruction of the wind on the plane of the rotor from the measurement performed by the LIDAR sensor on a measuring plane. This representation can be used for regulating or controlling the wind turbine.

1. Acquisition of the Measuring Signal (MES)

The LIDAR sensor performs a measurement relative to the wind speed at one measuring point located upstream from the wind turbine (opposite the rotor of the turbine). This measurement corresponds to the signal received by the sensor from the measuring point in response to the signal emitted by the LIDAR sensor. Indeed, through interferometry and Doppler effect, part of the laser signal emitted by the LIDAR sensor is reflected by the air molecules at the measuring point and also by aerosols (suspended dusts and microparticles). The measuring point is defined by the characteristics of the LIDAR sensor, notably the focal length and the orientation thereof. This measurement, which depends on the wind speed, is at a time and it depends on the orientation of the LIDAR sensor. This measurement is acquired in order to determine the wind speed at the rotor.

Figure 1:
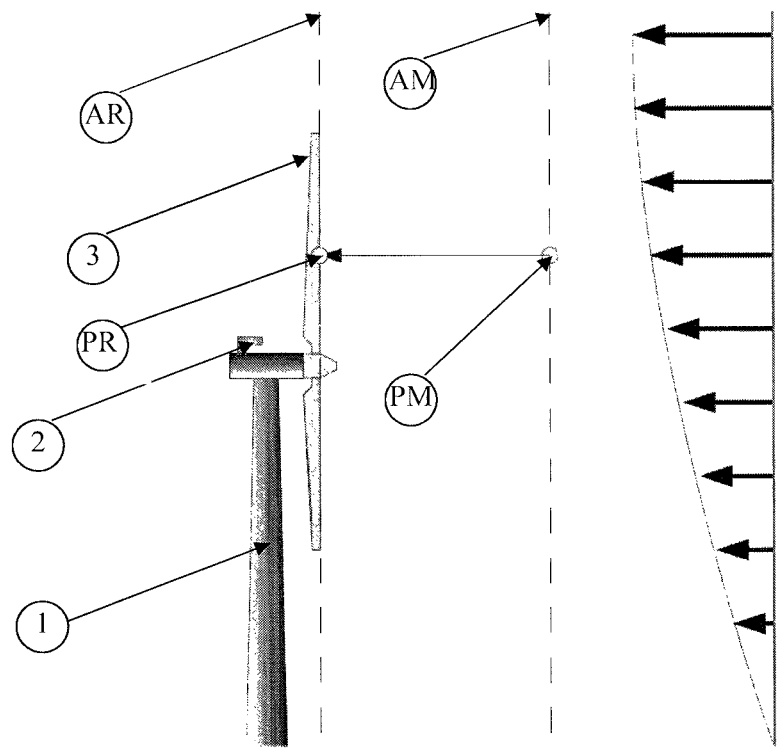
FIG. 1 illustrates a wind turbine equipped with a LIDAR sensor according to the invention.

FIG. 1 shows a wind turbine 1 equipped with a LIDAR sensor 2 suited for the method according to the invention. A LIDAR sensor 2 is used for measuring the wind speed at a given distance at a measuring point PM. The sensor is mounted, for example, on the nacelle of wind turbine 1 to be aligned with the wind direction. The sensor 2 measures the imminent wind, that is the wind that is a priori going to be encountered by the wind turbine. Knowing the wind measurement in advance allows a priori a large amount of information to be given.

FIG. 1 is used notably to describe the measuring process as follows: LIDAR sensor 2 measures the wind on measuring plane AM, in front of wind turbine 1 having a certain measuring characteristic. The projection of measuring point PM on the rotor plane AR is denoted by PR. The right-hand part of the figure illustrates an example of representation of the wind in the horizontal direction according to the height.

There are several types of LIDAR sensors, such as scanning or pulsed LIDAR sensors for example.

2. Construction of the Estimator of the Wind at the Rotor (EST)

In this stage, an estimator EST of the wind at the rotor is constructed which has three parts as shown in FIG. 2. The components are the representation of the wind which is REP W, a model of the LIDAR which is MOD LIDAR and a model of the wind propagation which is MOD PRO. The wind estimator allows estimating the wind speed (the three components thereof) at the rotor by use of the sensor signal provided by the LIDAR sensor. According to the invention, the estimator of the wind at the rotor is constructed by using a representation of the wind, a model of the LIDAR sensor and a wind propagation model. This estimator is a finite impulse response filter object that receives the raw measurement signal from the LIDAR sensor at point PM as its input and produces the wind estimation at point PR of the rotor plane as its output.

2.1 Wind Representation (REP W)

The instantaneous wind is defined at a given point as a vector made up of three components $w_x(t)$, $w_y(t)$, $w_z(t)$. The wind vector at a given time (t) and at a given point (x,y,z) is therefore represented by a relation of the type as follows:

$$\vec{w}(x,y,z,t) = w_x(x,y,z,t)\vec{x} + w_y(x,y,z,t)\vec{y} + w_z(x,y,z,t)\vec{z}$$

According to the invention, the type of wind representation used can be known beforehand, determined in real time or determined arbitrarily.

According to one embodiment of the invention, the three components of the speed $w_x(t)$, $w_y(t)$, $w_z(t)$ can be defined by their respective spectra $W_x$, $W_y$, $W_z$. The spectrum is assumed to be known or identified. It can be available in analytical form or in form of a table or of a data vector. For example, the Von Karman spectrum can be used for component x although the method provided allows adaption of any spectrum. According to this example, the equation can be written:

$$W_x(v) = \frac{0.475\sigma_x^2 \frac{L_v}{\overline{w}}}{\left(1 + \left(2\pi v \frac{L_v}{\overline{w}}\right)^2\right)^{5/6}}$$

Figure 3:
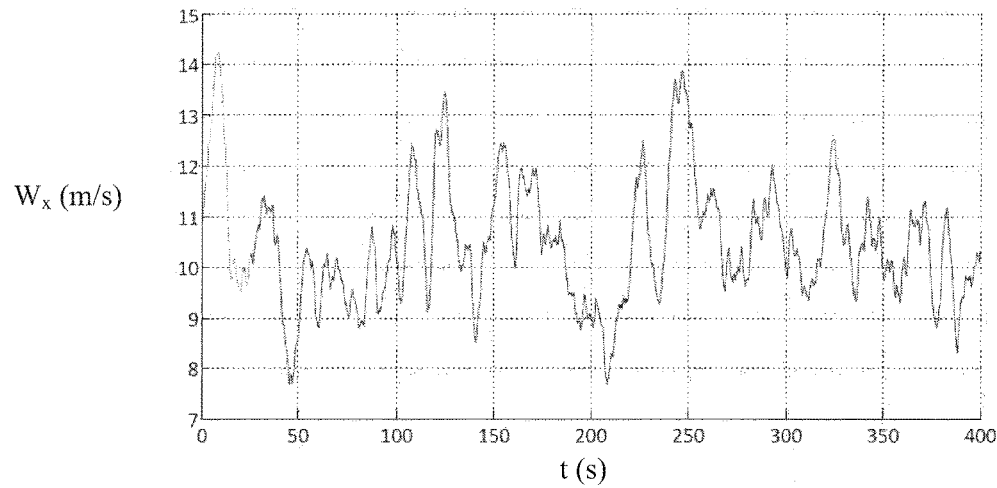
FIG. 3 illustrates a wind representation example.

$L_v$ is a parameter referred to as wavelength, $\sigma_x$ is a scaling factor characterizing the size of the turbulence and $\overline{w}$ is the average wind speed. This spectrum and its parameters can vary depending on the locations and on the day. The method according to the invention allows any spectrum to be taken into account. FIG. 3 is an example of representation of the wind speed $w_x$ along axis x as a function of time t, obtained by the Von Karman spectrum.

2.2 Wind Propagation Model (MOD PRO)

In order to account for the distance between measuring point (PM) where a measurement relative to the wind is performed and rotor plane (AR) for which it is desired to know the wind speed, the wind propagation over this distance is modelled.

According to an embodiment of the invention, the wind propagation model is constructed from at least one of the following hypotheses:

Unitary Wind Coherence

The unitary coherence hypothesis means that the wind vector is the same over vertical planes perpendicular to the wind direction.

$$w_x(x,y,z,t)=w_x(x,0,0,t) \ w_y(x,y,z,t)=w_y(x,0,0,t)$$
$$w_z(x,y,z,t)=w_z(x,0,0,t)$$

Taylor's Frozen Turbulence Hypothesis

The frozen turbulence hypothesis means that the turbulence propagates at the average wind speed.

$$\vec{w}(x+dx,y,z,t) = \vec{w}(x,y,z,t-dx/\overline{w})$$

These two hypotheses are good approximations for the local scales that are considered for the method according to the invention.

2.2 Model of the LIDAR Sensor (MOD LIDAR)

Figure 4:
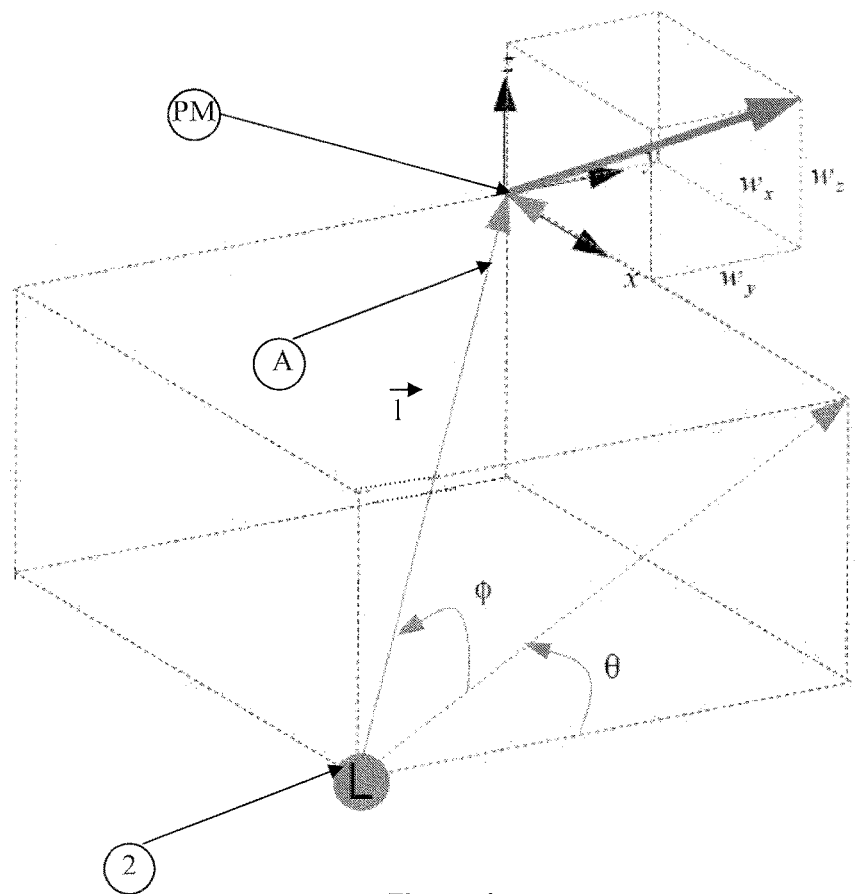
FIG. 4 illustrates the three-dimensional characteristics of the measurement of the LIDAR sensor.

The measurement of the LIDAR sensor is characterized by two functions. FIG. 4 shows the three-dimensional characteristics of the measurement performed by the LIDAR sensor. The first function corresponds to the measuring axis and it can be denoted by:

$$\vec{l} = [\sin(\phi) \quad \cos(\phi)\cos(\theta) \quad \cos(\phi)\sin(\theta)] \begin{bmatrix} \vec{x} \\ \vec{y} \\ \vec{z} \end{bmatrix}$$

The second characteristic corresponds to a spatial (or volume) characteristic of the LIDAR sensor. Measurement m(t) can be expressed by a relation of the form as follows:

$$m(t) = \int_0^{+\infty} \left(\vec{l}(\phi,\theta) \cdot \vec{w}(l\sin(\phi), l\cos(\phi)\cos(\theta), l\cos(\phi)\sin(\theta), t)\right) f(l, l_0) dl$$

$f(l,l_0)$ is the spatial characteristic, $l_0$ is the focal length and it can depend on the configuration of the LIDAR sensor. The model expressed above is adaptable to the type of LIDAR sensor (scanning or pulsed) used by the function f.

For example, in the case of the scanning LIDAR sensor, this spatial characteristic can be written by a relation of the form as follows:

$$f(l, l_0) = \frac{K}{l^2 + \left(1 - \frac{l}{l_0}\right)^2 \Gamma},$$

where δ is the Rayleigh constant (1570) and K is a regulation factor.

Under the hypotheses provided, the measurement equation of the LIDAR sensor can be put into the form of a convolution product, which has a frequency response.

By applying Taylor's hypothesis, the equation can be written:

$$m(t) = \int_0^{+\infty} \left(\vec{l}(\phi,\theta) \cdot \vec{w}\left(0, l\cos(\phi)\cos(\theta), l\cos(\phi)\sin(\theta), t + \frac{l\sin(\phi)}{\overline{w}}\right)\right) f(l, l_0) dl$$

By selecting a unitary coherence, the equation can be written:

$$m(t) = \int_0^{+\infty} \left(\vec{l}(\phi,\theta) \cdot \vec{w}\left(t + \frac{l\sin(\phi)}{\overline{w}}\right)\right) f(l, l_0) dl$$

Then, by developing the scalar product the equations become:

$$m(t) = \begin{cases} \sin(\phi) \int_0^{+\infty} \vec{w}_x\left(t + \frac{l\sin(\phi)}{\overline{w}}\right) f(l, l_0) dl \\ \cos(\phi)\cos(\theta) \int_0^{+\infty} \vec{w}_y\left(t + \frac{l\sin(\phi)}{\overline{w}}\right) f(l, l_0) dl \\ \cos(\phi)\sin(\theta) \int_0^{+\infty} \vec{w}_y\left(t + \frac{l\sin(\phi)}{\overline{w}}\right) f(l, l_0) dl \end{cases}$$

The following variable changes are set:

$$\tau = \frac{l\sin(\phi)}{\overline{w}},$$

$$l = \frac{\tau \overline{w}}{\sin(\phi)},$$

$$\overline{f}(\tau) = \frac{K}{\left(\frac{\tau \overline{w}}{\sin(\phi)}\right)^2 + \left(1 + \frac{\tau \overline{w}}{l_0 \sin(\phi)}\right)^2 \Gamma},$$

Then an equation as follows is obtained:

$$m(t) = \begin{cases} \sin(\phi) \int_{-\infty}^{+\infty} \vec{w}_x(t + \tau) \overline{f}(\tau) dl \\ \cos(\phi)\cos(\theta) \int_{-\infty}^{+\infty} \vec{w}_y(t + \tau) \overline{f}(\tau) dl \\ \cos(\phi)\sin(\theta) \int_{-\infty}^{+\infty} \vec{w}_y(t + \tau) \overline{f}(\tau) dl \end{cases}$$

Figure 5:
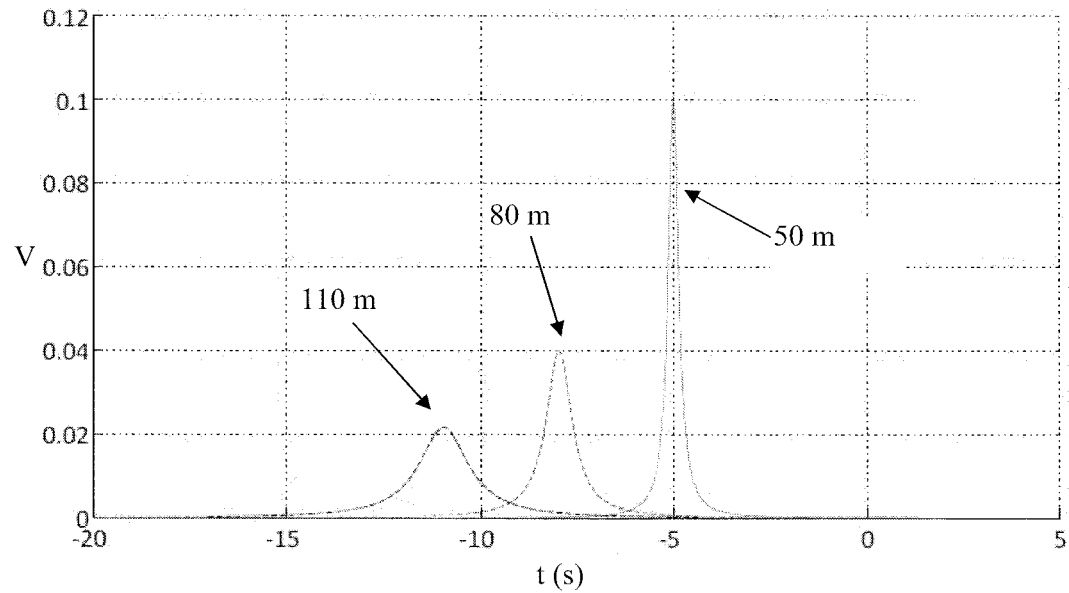
FIG. 5 illustrates a pulse response of the LIDAR sensor under Taylor's frozen turbulence assumption, for a LIDAR sensor pointing in the direction opposite of the average wind vector, for three focal measuring lengths.

This is the equation of a convolution product, of a system whose impulse response is defined by $\overline{f}(\tau)$. FIG. 5 illustrates an example of response V to an impulse as a function of time for a LIDAR sensor with different focal lengths $l_0$. The abscissas are given by t=l/average speed.

The LIDAR sensor can thus be seen, under these hypotheses, as a convolution system whose impulse response is as follows:

$$\overline{f}(\tau) = \frac{K\sin^2(\phi)}{(\tau\overline{w})^2 + (l_0\sin(\phi) + \tau\overline{w})^2\Gamma},$$

or $$\overline{f}\left(\tau - \frac{l_0\sin(\phi)}{\overline{w}}\right) = \frac{K\sin^2(\phi)}{(\tau - l_0\sin(\phi))^2 + (\tau\overline{w})^2\Gamma^2}$$

which can be approximated by $$\overline{f}\left(\tau - \frac{l_0\sin(\phi)}{\overline{w}}\right) = \frac{K\sin^2(\phi)}{(\tau\overline{w})^2\Gamma^2}$$

considering the order of constant $\Gamma$. The frequency response of the system can therefore be written as follows:

$$e^{2i\pi v \frac{l_0\sin(\phi)}{\overline{w}}} L(v)$$

where $L(v)$ is the Fourier transform of function $$\overline{f}\left(\tau - \frac{l_0\sin(\phi)}{\overline{w}}\right).$$

These stages are systematic, and they only depend on the average wind speed and the volume characteristic. In practice, a vector of a value corresponding to function $L(v)$ is very easily obtained.

If the function $$\overline{f}\left(\tau - \frac{l_0\sin(\phi)}{\overline{w}}\right)$$

is not symmetric about $l_0$, as in the case of the scanning LIDAR sensor, it nevertheless remains a good approximation. In the case of the pulsed LIDAR sensor, the function is symmetric. Considering that the function is symmetric, frequency response $L(v)$ is real.

Therefore, the model (measurement) of the LIDAR sensor, under the aforementioned hypotheses, can be written in the frequency domain as follows:

$$M(v) = e^{2i\pi v \frac{l_0\sin(\phi)}{\overline{w}}} L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix}$$

2.4 Construction of the Wind Estimator

The models of the LIDAR sensor, of the wind propagation and the wind representation are used as inputs for the construction of the estimator of the wind at the rotor.

The reconstruction method is conducted in two stages. First, the optimum frequency response of the estimator is calculated. The impulse response of a convolution system having this frequency response is then calculated.

According to the invention, it is desired to estimate at least one component of the wind speed at the rotor, notably the longitudinal component on the rotor plane. Alternatively, the estimator allows estimation of the three components of the wind speed. Therefore, an attempt is made to minimize an estimation error e(t) that is defined by the difference between the estimation of the speed on the rotor plane and the real speed on this plane. Thus, the estimation error spectrum $E(v)$ can be written:

$$E(v) = \begin{bmatrix} 1 & -F(v)e^{2i\pi v \frac{l_0\sin(\phi)}{\overline{w}}} & L(v) \end{bmatrix}$$

$$\begin{bmatrix} 1 & 0 & 0 \\ \sin(\phi) & \cos(\phi)\sin(\theta) & \cos(\phi)\cos(\theta) \end{bmatrix} \begin{bmatrix} W_x(v) \\ W_y(v) \\ W_z(v) \end{bmatrix}$$

The following notations are also used:

$$W_l(v) = [W_x(v) \quad 0 \quad 0]$$

$$M(v) = e^{2i\pi v \frac{l_0\sin(\phi)}{\overline{w}}} L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix}$$

$$= e^{2i\pi v \frac{l_0\sin(\phi)}{\overline{w}}} M_R(v)$$

The solution minimizing the power spectral density of the estimation error is written in the form as follows:

$$F(v) = W_l(v)M^*(v)(M(v)M^*(v)+\alpha^2)^{-1}$$

It can be noted in this form that the terms $W_l(v)$ and $(M(v)M^*(v)+\alpha^2)^{-1} = (M_R(v)M_R^T(v)+\alpha^2)^{-1}$ are real terms. Thus, the frequency response of the estimator of the wind $F(v)$ at the rotor can be written as follows:

$$F(v) = e^{-2i\pi v \frac{l_0\sin(\phi)}{\overline{w}}} W_l(v)M_R(v)(M_R(v)M_R^T(v)+\alpha^2)^{-1}$$

To construct the estimator of the wind at the rotor using this frequency response, several methods can be used, notably a windowing method, in particular using a Hanning window. For this method, a technique allowing creation of a causal filter having a frequency characteristic of the form as follows is developed:

$$F(v) = e^{-2i\pi v\tau} S(v)$$

The creation of the estimator occurs in two stages:
first the impulse response of the non-causal filter of the continuous filter having the frequency response $S(v)$ is calculated; and
the impulse response is then shifted in time to obtain the impulse response of the filter having the characteristic that is sought. Samples are then selected at a given sampling frequency, in a given window. The approximation obtained is thus of quality.

Figure 6A:
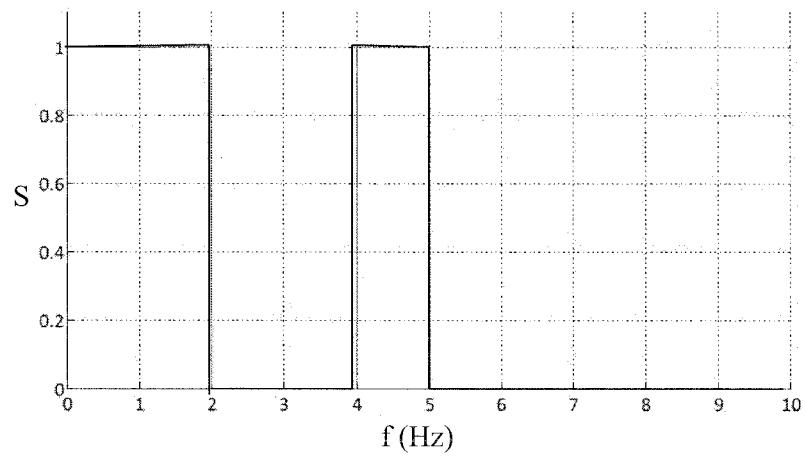
FIGS. 6a to 6g illustrate the various stages of the windowing method for one example.

FIGS. 6a to 6g illustrate the various stages of the windowing method for one example. In this example, a filter for which the following frequency response is desired is defined: 1 between 0 and 2 Hz and 4-5 Hz, 0 elsewhere, the desired delay being 5 s. FIG. 6a illustrates this desired response.

Figure 6B:
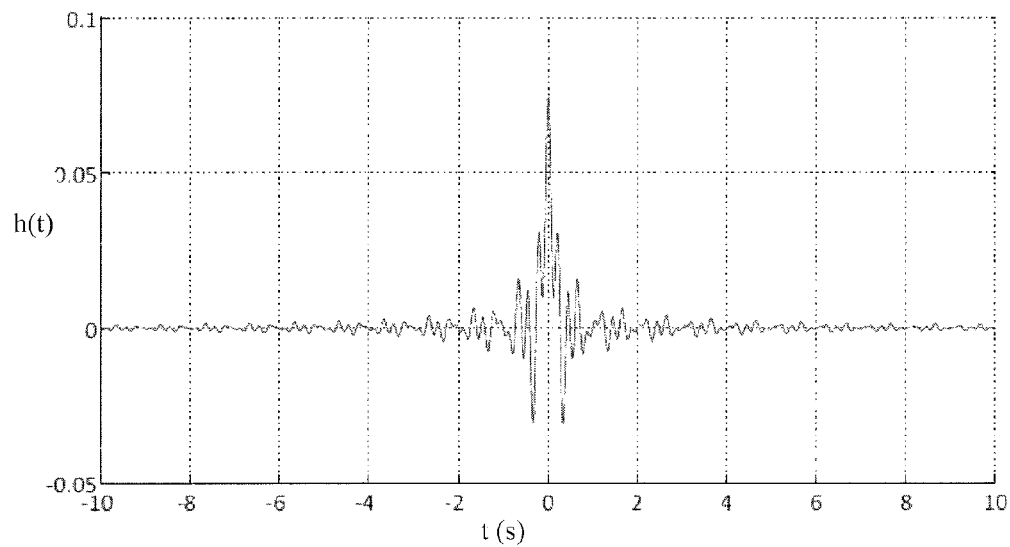

The first stage thus calculates the impulse response exhibiting the frequency response shown in FIG. 6b.

A frequency vector of the form as follows is first defined:

$$[0, 1*Fs/N, 2*Fs/N, \ldots (n-1)*Fs/N],$$

with Fs the sampling frequency and N the number of samples.

For these frequencies, the frequency response of the filter is defined:

$$[S(0), S(Fs/N), S(2Fs/N), \ldots, S((N-1)Fs/N)]$$

The response that is sought is the response of a discrete filter, symmetric about the axis.

The following vector is thus defined:

$$[S(0)+S((N-1)Fs/N), S(Fs/N)+S((N-2)Fs/N), \ldots, S((N-1)Fs/N)+S(Fs/N)]$$

By applying the inverse discrete Fourier transform, the impulse response ID illustrated in FIG. 6b is obtained after rearrangement.

Figure 6C:
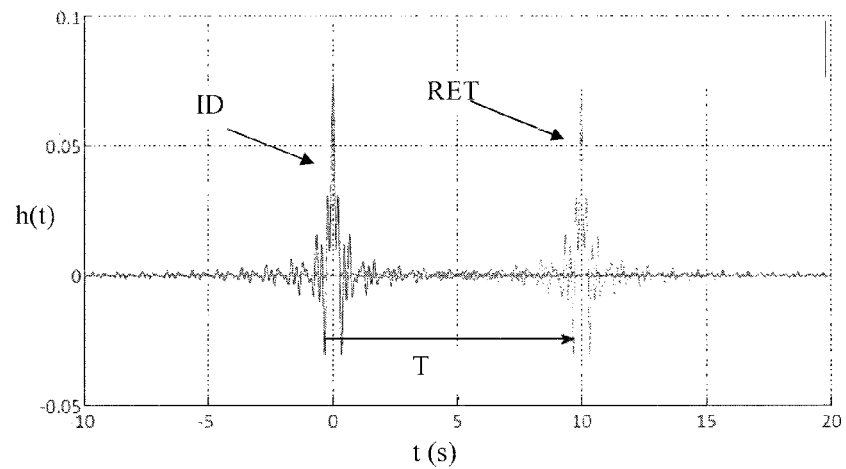

This impulse response contains N samples and it is sampled at a sampling frequency Fs. The estimator having this impulse response is a discrete filter, non-causal, of frequency response $S(v)$. The frequency response that is sought is of the type: $F(v)=e^{-2i\pi v \tau}S(v)$. Part $e^{-2i\pi v \tau}$ is a time delay $\tau$. The impulse response of the filter having the frequency response that is sought can therefore be obtained after a simple shift. FIG. 6c shows the desired impulse response RET obtained by shifting ID. This figure illustrates the ideal impulse response ID and the impulse response obtained after delay RET by a translation T.

The next stage approximates this impulse response obtained through windowing. Several types of windows can be used in general, the Hanning window gives an excellent approximation.

The Hanning window is defined by:

$$H(t) = \begin{cases} \dfrac{1}{2} + \dfrac{1}{2}\cos\left(\dfrac{2\pi\left(t - \dfrac{Ta}{2}\right)}{Ta}\right), & t \in [-Ta, Ta] \\ 0 & \text{elsewhere} \end{cases}$$

The impulse response is multiplied by $H(t-\tau)$, or $\tau$ corresponds to the desired delay. Parameter Ta allows selection of the approximation quality, and it ranges between 0 and $\tau$.

Figure 6D:
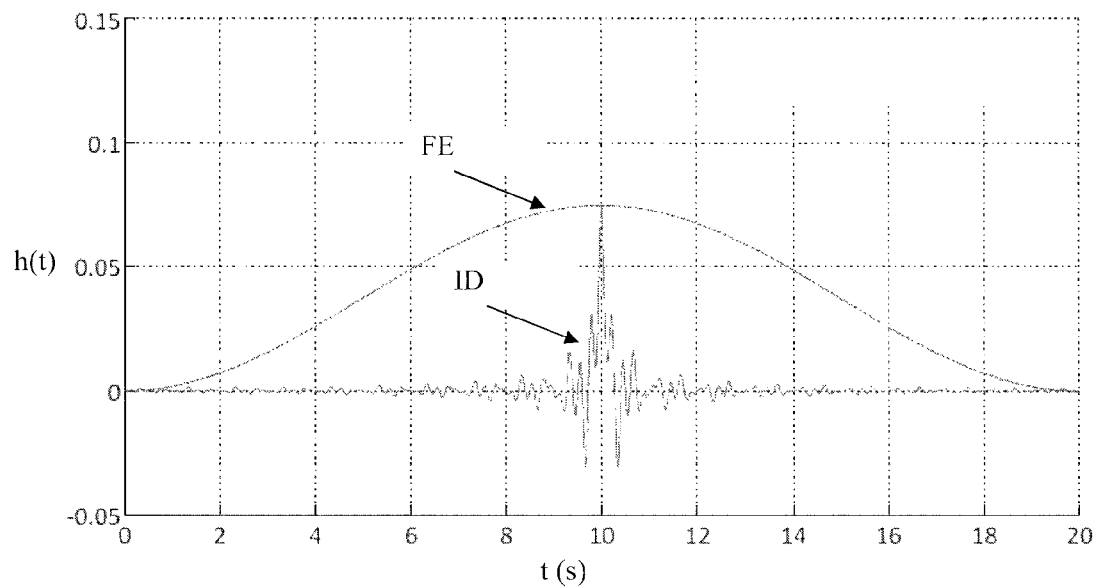

FIG. 6d shows how the windowing allows an interval to be selected. This figure shows windowing FE and ideal impulse response ID as a function of time.

Figure 6E:
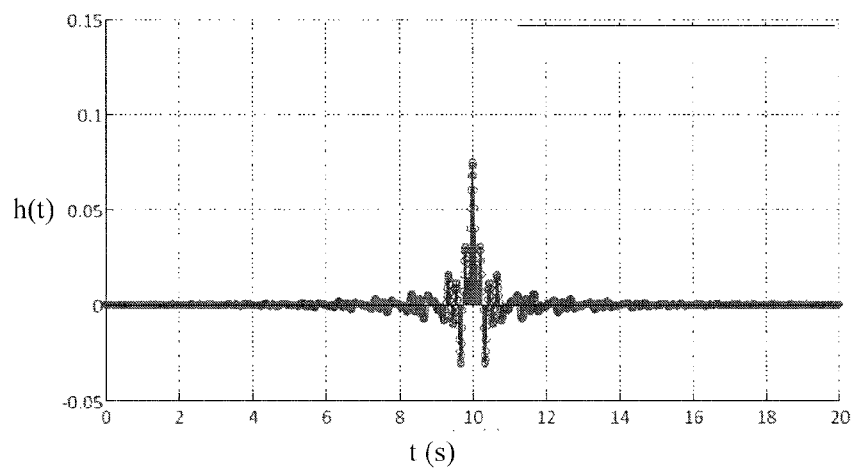

Application of these stages allows a vector to be obtained. The values of this vector need to be regularized so that their sum equals $S(0)$ which is the response of the wind estimator at zero frequency. After regularization, the values of this vector give the coefficients of a discrete FIR filter at the sampling frequency Fs. FIG. 6e illustrates the frequency response of the FIR filter as a function of time.

Figure 6F:
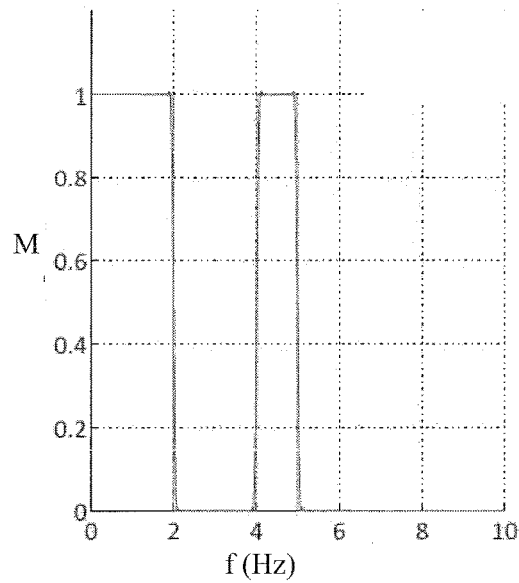
Figure 6G:
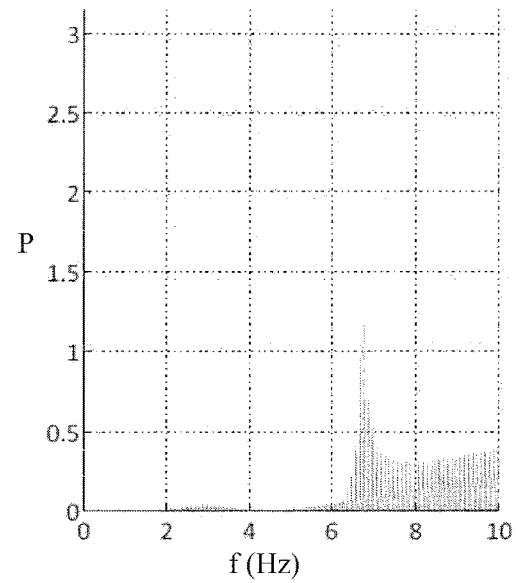

If the frequency response of this filter is analyzed by considering its frequency response M and its phase P as a function of frequency f, as shown in FIGS. 6f and 6g respectively, it is obvious that the phase corresponds perfectly to the desired delay (the curve obtained is substantially superimposed on the desired curve) and that the amplitude is a good approximation of the specifications.

The construction of the estimator thus is a very generic method allowing tuning an estimator (filter) whose frequency response is known, which has a form similar to the form solution to the optimum filtering problem. The contribution is the combination of modelling, of putting in form the estimation problem and its solution, and using the windowing method for implementing the filter.

The generic character is provided by the fact that the method operates regardless whatever the characteristic of the LIDAR sensor and whatever the wind representation are. A solution can always be found and implemented using the windowing method. Thus, the estimator of the wind at the rotor is valid for all the wind representations and all the LIDAR sensor models.

Another important point is that all of the calculations are efficient in the sense of algorithmic complexity. They are fast (the calculation time is not important). This method allows creation of a filter object that can be easily implemented. It is this object that provides reconstruction of the wind at the rotor.

3. Estimation of the Wind at the Rotor (West)

In this stage, the wind speed at the rotor is estimated by the acquired measurements and of the estimator of the wind at the rotor. The estimator that is constructed is therefore applied to the signal acquired at the measuring point.

Preferably, the estimation relates to the three components of the wind speed at the rotor. Alternatively, the estimation of the wind speed concerns at least one component of the wind speed, in particular the longitudinal component of the wind speed.

The calculation time is short in relation to the application, making possible determination of the wind speed at the rotor in advance.

4. Controlling and/or Monitoring of the Wind Turbine (CON)

According to the estimated wind speed w at the rotor, the wind turbine can be controlled to optimize the energy recovered. According to the invention, the angle of inclination of the blades and/or the electrical recovery torque of the generator of the wind turbine can be controlled as a function of the wind speed. Other types of regulation devices can be used.

According to an embodiment of the invention, the angle of inclination of the blades and/or the electrical recovery torque are determined using maps of the wind turbine as a function of the wind speed at the rotor. For example, the control method described in patent application FR-2,976, 630 A1 corresponding to U.S. Published Application 2012/0,321,463 can be applied.

Control of the wind turbine allows the recovered energy to be optimized. Furthermore, by means of this control, the LIDAR sensor allows the expenses relative to the structure, the blades and the tower representing 54% of the cost, to be reduced. Using a LIDAR sensor therefore allows optimizing the structure of the wind turbine and thus decreasing the cost and maintenance thereof.

Besides, the estimation of the wind at the rotor can be used for monitoring the turbine. For example, it can be used for real-time supervision of the turbine or for diagnosis of a failure thereof. According to an embodiment of the invention, monitoring of the electrical recovery torque of a generator of the wind turbine is performed as a function of the estimated wind speed.

Alternatively, the estimation of the wind speed at the rotor can be used jointly for controlling and monitoring the wind turbine.

The invention also relates to a wind turbine, notably an offshore wind turbine equipped with a LIDAR sensor. According to an embodiment of the invention, the LIDAR sensor can be arranged on the nacelle of the turbine. The LIDAR sensor is so oriented as to perform a wind measurement upstream from the wind turbine. The turbine comprises a control, for example a pitch angle control, for implementing the method according to the invention.

Application Example

In this section, a detailed example of the stages of creation of the estimator allowing reconstruction of the wind on the rotor plane is described as follows.

Wind Spectrum

This spectrum is assumed to be known or identified. It can be available in analytical form or in form of a table or of a data vector. For this example, the wind spectrum is expressed by the Von Karman spectrum.

Frequency Characteristic of the LIDAR Sensor

The characteristic of the LIDAR sensor is given in form of a function of the focal length $l_0$. The function is an integral on the axis which is a weighted integral of the scalar product of the wind vector at one point on the axis toward which the LIDAR sensor is pointing. In the case of a scanning LIDAR sensor, the weighting function is $$f(l, l_0) = \frac{K}{l^2 + \left(1 - \frac{l}{l_0}\right)^2 \Gamma}.$$

The frequency characteristic of the LIDAR sensor can be obtained in two stages with the first one involving variable change $$\tau = \frac{l \sin(\phi)}{\overline{w}},$$

then the second stage recenters the characteristic around $$\frac{l_0 \sin(\phi)}{\overline{w}}.$$

The frequency response can then be characterized by an analytical solution, or numerical using the discrete Fourier transform. The frequency response of the LIDAR sensor is then available:

$$e^{2i\pi v \frac{l_0 \sin(\phi)}{\overline{w}}} L(v).$$

Wind estimator construction

The optimum response of the wind estimator can then be calculated:

$$F(v) = e^{-2i\pi v \frac{l_0 \sin(\phi)}{\overline{w}}} W_l(v) M_R(v) (M_R(v) M_R^T(v) + \alpha^2)^{-1}$$

$$W_l(v) = [W_x(v) \quad 0 \quad 0]$$

$$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix}$$

The windowing method is then implemented to create the filter having the frequency response $$F(v) = e^{-2i\pi v \frac{l_0 \sin(\phi)}{\overline{w}}} W_l(v) M_R(v) (M_R(v) M_R^T(v) + \alpha^2)^{-1}.$$

Figure 7A:
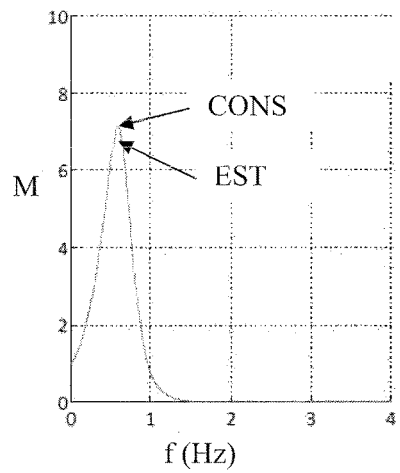
FIGS. 7a to 7d illustrate the stages of the method according to the invention for one example.
Figure 7B:
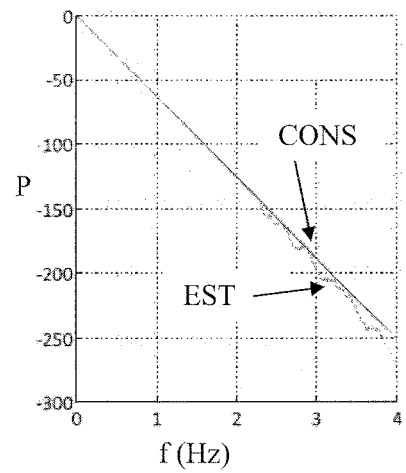

The frequency having a response as illustrated in FIGS. 7a and 7b is thus obtained. In FIG. 7a, it can be seen that, for amplitude M, the curve of setpoint CONS is nearly superimposed on estimated curve EST. In FIG. 7b, concerning phase P, it can be seen that the curves of setpoint CONS and of estimation EST are quite close.

Wind speed estimation

Figure 7C:
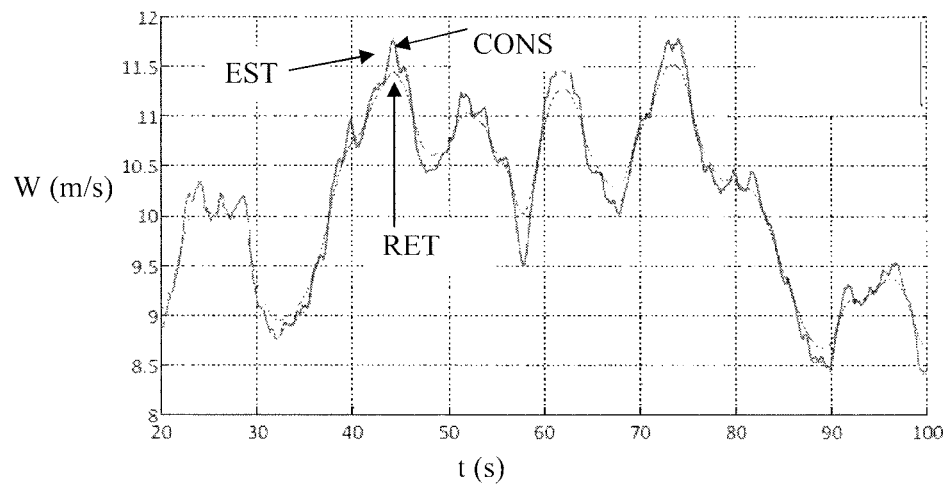
Figure 7D:
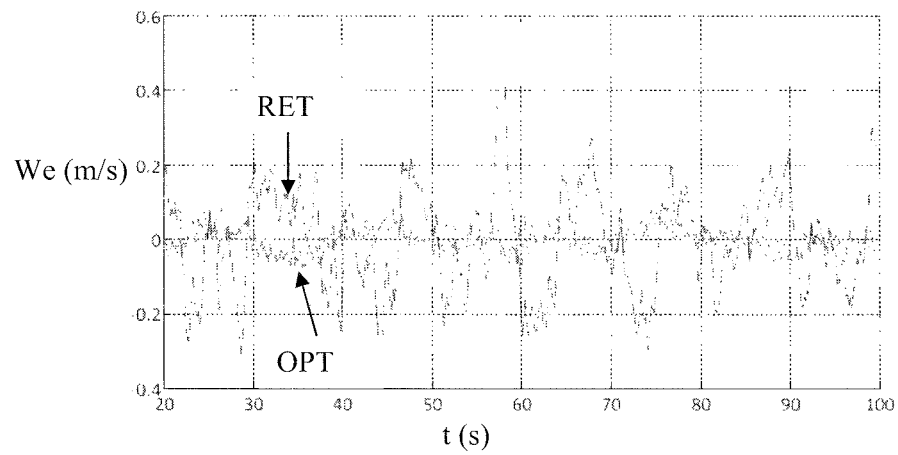

The signal measured by the LIDAR sensor is then passed into the estimator constructed to recover the wind estimation on the rotor plane. FIG. 7c shows the curves relative to the wind speed for the signals of setpoint CONS (corresponding to the real wind speed at the rotor), of estimator EST (corresponding to the wind speed calculated by the estimator) and delay RET (corresponding to the impulse response of the filter which is desired, which corresponds to the impulse response of the delayed ideal filter. This delay corresponds to the delay of the wind arrival on the rotor plane). FIG. 7d enables comparison of the speed error for the optimal estimator (OPT) and delay RET.

It can be observed that the estimator according to the invention allows precise estimation of the wind speed at the rotor. Thus, control of the wind turbine can be efficiently adjusted as a function of the wind.

The invention claimed is:

1. A method for at least one of controlling and monitoring a wind turbine equipped with a LIDAR sensor performing a measurement of the wind at a point located upstream from the wind turbine, comprising:
    a) acquiring a sensor signal corresponding to the measurement performed by the LIDAR sensor;
    b) constructing an estimator for estimating wind speed at the rotor of the turbine from processing the sensor signal using a mathematical representation of the wind, a model of the LIDAR sensor and a model of wind propagation which relates the sensor signal to the wind speed at the rotor;
    c) estimating the wind speed at the rotor of the turbine by applying the sensor signal to the estimator which converts the sensor signal at the point upstream from the rotor into an output signal expressing an estimation of wind speed at a plane of the rotor; and
    d) at least one of controlling and monitoring the wind turbine in response to the estimation of the wind speed at the plane of the rotor.

2. A method as claimed in claim 1, wherein the wind turbine is controlled by controlling at least one of an angle of inclination of blades of the turbine and electrical recovery torque of an electrical generator at the turbine.

3. A method as claimed in claim 1, comprising performing monitoring the electrical recovery torque of a generator of the wind turbine as a function of the estimated wind speed.

4. A method as claimed in claim 1, wherein the mathematical representation of the wind is a frequency model expressed as a Von Karman spectrum.

5. A method as claimed in claim 2, wherein the mathematical representation of the wind is a frequency model expressed as a Von Karman spectrum.

6. A method as claimed in claim 3, wherein the mathematical representation of the wind is a frequency model expressed as a Von Karman spectrum.

7. A method as claimed in claim 4, wherein the mathematical representation of the wind is a frequency model expressed as a Von Karman spectrum.

8. A method as claimed in claim 5, wherein the mathematical representation of the wind is a frequency model expressed as a Von Karman spectrum.

9. A method as claimed in claim 6, wherein the mathematical representation of the wind is a frequency model expressed as a Von Karman spectrum.

10. A method as claimed in claim 1, wherein the model of the LIDAR sensor depends on at least one of a measuring angle of the LIDAR sensor and a volume characteristic of the LIDAR sensor.

11. A method as claimed in claim 2, wherein the model of the LIDAR sensor depends on at least one of a measuring angle of the LIDAR sensor and a volume characteristic of the LIDAR sensor.

12. A method as claimed in claim 3, wherein the model of the LIDAR sensor depends on at least one of a measuring angle of the LIDAR sensor and a volume characteristic of the LIDAR sensor.

13. A method as claimed in claim 4, wherein the model of the LIDAR sensor depends on at least one of a measuring angle of the LIDAR sensor and a volume characteristic of the LIDAR sensor.

14. A method as claimed in claim 10, wherein the model of the LIDAR sensor $M(v)$ is written in the frequency domain by a relation as follows:

$$M(v) = e^{2i\pi v \frac{l_0 \sin(\phi)}{\overline{w}}} L(v)[\ \sin(\phi) \quad \cos(\phi)\sin(\theta) \quad \cos(\phi)\cos(\theta)\ ] \begin{bmatrix} W_x(v) \\ W_y(v) \\ W_z(v) \end{bmatrix}$$

with $L(v)$ being a Fourier transform of function $$\overline{f}\left(\tau - \frac{l_0 \sin(\phi)}{\overline{w}}\right)$$

and $$\overline{f}\left(\tau - \frac{l_0 \sin(\phi)}{\overline{w}}\right) = \frac{K \sin^2(\phi)}{(\tau \overline{w})^2 \Gamma^2},$$

$$\tau = \frac{l \sin(\phi)}{\overline{w}},$$

$l_0$ being the focal length of the LIDAR sensor, $l$ being a measuring distance, $\theta$ and $\phi$ being orientation angles of the LIDAR sensor, $\overline{w}$ being an average wind speed, $\Gamma$ being a Rayleigh constant, $K$ being a regulation factor, and $W_x$, $W_y$, $W_z$ being components of wind speed at the point of measurement.

15. A method as claimed in claim 11, wherein the model of the LIDAR sensor $M(v)$ is written in the frequency domain by a relation as follows:

$$M(v) = e^{2i\pi v \frac{l_0 \sin(\phi)}{\overline{w}}} L(v)[\ \sin(\phi) \quad \cos(\phi)\sin(\theta) \quad \cos(\phi)\cos(\theta)\ ] \begin{bmatrix} W_x(v) \\ W_y(v) \\ W_z(v) \end{bmatrix}$$

with $L(v)$ being a Fourier transform of function $$\overline{f}\left(\tau - \frac{l_0 \sin(\phi)}{\overline{w}}\right)$$

and $$\overline{f}\left(\tau - \frac{l_0 \sin(\phi)}{\overline{w}}\right) = \frac{K \sin^2(\phi)}{(\tau \overline{w})^2 \Gamma^2},$$

$$\tau = \frac{l \sin(\phi)}{\overline{w}},$$

$l_0$ being the focal length of the LIDAR sensor, $l$ being a measuring distance, $\theta$ and $\phi$ being orientation angles of the LIDAR sensor, $\overline{w}$ being an average wind speed, $\Gamma$ being a Rayleigh constant, $K$ being a regulation factor, and $W_x$, $W_y$, $W_z$ being components of wind speed at the point of measurement.

16. A method as claimed in claim 12, wherein the model of the LIDAR sensor $M(v)$ is written in the frequency domain by a relation as follows:

$$M(v) = e^{2i\pi v \frac{l_0 \sin(\phi)}{\overline{w}}} L(v)[\ \sin(\phi) \quad \cos(\phi)\sin(\theta) \quad \cos(\phi)\cos(\theta)\ ] \begin{bmatrix} W_x(v) \\ W_y(v) \\ W_z(v) \end{bmatrix}$$

with $L(v)$ being a Fourier transform of function $$\overline{f}\left(\tau - \frac{l_0 \sin(\phi)}{\overline{w}}\right)$$

and $$\overline{f}\left(\tau - \frac{l_0 \sin(\phi)}{\overline{w}}\right) = \frac{K \sin^2(\phi)}{(\tau \overline{w})^2 \Gamma^2},$$

$$\tau = \frac{l \sin(\phi)}{\overline{w}},$$

$l_0$ being the focal length of the LIDAR sensor, $l$ being a measuring distance, $\theta$ and $\phi$ being orientation angles of the LIDAR sensor, $\overline{w}$ being an average wind speed, $\Gamma$ being a Rayleigh constant, $K$ being a regulation factor, and $W_x$, $W_y$, $W_z$ being components of wind speed at the point of measurement.

17. A method as claimed in claim 13, wherein the model of the LIDAR sensor $M(v)$ is written in the frequency domain by a relation as follows:

$$M(v) = e^{2i\pi v \frac{l_0 \sin(\phi)}{\overline{w}}} L(v)[\ \sin(\phi) \quad \cos(\phi)\sin(\theta) \quad \cos(\phi)\cos(\theta)\ ] \begin{bmatrix} W_x(v) \\ W_y(v) \\ W_z(v) \end{bmatrix}$$

with L(v) being a Fourier transform of function $$\bar{f}\left(\tau - \frac{l_0 \sin(\phi)}{\bar{w}}\right)$$

and $$\bar{f}\left(\tau - \frac{l_0 \sin(\phi)}{\bar{w}}\right) = \frac{K \sin^2(\phi)}{(\tau \bar{w})^2 \Gamma^2},$$

$$\tau = \frac{l \sin(\phi)}{\bar{w}},$$

$l_0$ being the focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, K being a regulation factor, and $W_x$, $W_y$, $W_z$ being components of wind speed at the point of measurement.

18. A method as claimed in claim 1, wherein a frequency response of the estimator of the wind at the rotor F(v) is written by a relation as follows:

$$F(v) = e^{-2i\pi v \frac{l_0 \sin(\phi)}{\bar{w}}} W_l(v) M_R(v) (M_R(v) M_R^T(v) + \alpha^2)^{-1}$$

with $$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix},$$

$W_l(v)=[W_x(v) \; 0 \; 0]$, L(v) being a Fourier transform of function $$\bar{f}\left(\tau - \frac{l_0 \sin(\phi)}{\bar{w}}\right)$$

and $$\bar{f}\left(\tau - \frac{l_0 \sin(\phi)}{\bar{w}}\right) = \frac{K \sin^2(\phi)}{(\tau \bar{w})^2 \Gamma^2},$$

$$\tau = \frac{l \sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, K being a regulation factor, $W_x$, $W_y$, $W_z$ being the components of the wind speed at the point of measurement and $\alpha$ being a regularization parameter.

19. A method as claimed in claim 2, wherein a frequency response of the estimator of the wind at the rotor F(v) is written by a relation as follows:

$$F(v) = e^{-2i\pi v \frac{l_0 \sin(\phi)}{\bar{w}}} W_l(v) M_R(v) (M_R(v) M_R^T(v) + \alpha^2)^{-1}$$

with $$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix},$$

$W_l(v)=[W_x(v) \; 0 \; 0]$, L(v) being a Fourier transform of function $$\bar{f}\left(\tau - \frac{l_0 \sin(\phi)}{\bar{w}}\right)$$

and $$\bar{f}\left(\tau - \frac{l_0 \sin(\phi)}{\bar{w}}\right) = \frac{K \sin^2(\phi)}{(\tau \bar{w})^2 \Gamma^2},$$

$$\tau = \frac{l \sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, K being a regulation factor, $W_x$, $W_y$, $W_z$ being components of the wind speed at the point of measurement and $\alpha$ being a regularization parameter.

20. A method as claimed in claim 3, wherein a frequency response of the estimator of the wind at the rotor F(v) is written by a relation as follows:

$$F(v) = e^{-2i\pi v \frac{l_0 \sin(\phi)}{\bar{w}}} W_l(v) M_R(v) (M_R(v) M_R^T(v) + \alpha^2)^{-1}$$

with $$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix},$$

$W_l(v)=[W_x(v) \; 0 \; 0]$, L(v) being a Fourier transform of function $$\bar{f}\left(\tau - \frac{l_0 \sin(\phi)}{\bar{w}}\right)$$

and $$\bar{f}\left(\tau - \frac{l_0 \sin(\phi)}{\bar{w}}\right) = \frac{K \sin^2(\phi)}{(\tau \bar{w})^2 \Gamma^2},$$

$$\tau = \frac{l \sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, K being a regulation factor, $W_x$, $W_y$, $W_z$ being components of the wind speed at the point of measurement and $\alpha$ being a regularization parameter.

21. A method as claimed in claim 4, wherein a frequency response of the estimator of the wind at the rotor F(v) is written by a relation as follows:

$$F(v) = e^{-2i\pi v \frac{l_0 \sin(\phi)}{\bar{w}}} W_l(v) M_R(v) (M_R(v) M_R^T(v) + \alpha^2)^{-1}$$

with $$M_R(v) = L(v)[\sin(\phi) \quad \cos(\phi)\sin(\theta) \quad \cos(\phi)\cos(\theta)] \begin{bmatrix} W_x(v) \\ W_y(v) \\ W_z(v) \end{bmatrix},$$

$W_l(v)=[W_x(v)\ 0\ 0]$, $L(v)$ being a Fourier transform of function $$\bar{f}\left(\tau - \frac{l_0\sin(\phi)}{\bar{w}}\right)$$

and $$\bar{f}\left(\tau - \frac{l_0\sin(\phi)}{\bar{w}}\right) = \frac{K\sin^2(\phi)}{(\tau\bar{w})^2\Gamma^2},$$

$$\tau = \frac{l\sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, $K$ being a regulation factor, $W_x$, $W_y$, $W_z$ being components of the wind speed at the point of measurement and $\alpha$ being a regularization parameter.

22. A method as claimed in claim 7, wherein a frequency response of the estimator of the wind at the rotor $F(v)$ is written by a relation as follows:

$$F(v) = e^{-2i\pi v \frac{l_0\sin(\phi)}{\bar{w}}} W_l(v) M_R(v)(M_R(v)M_R^T(v) + \alpha^2)^{-1}$$

with $$M_R(v) = L(v)[\ \sin(\phi)\quad \cos(\phi)\sin(\theta)\quad \cos(\phi)\cos(\theta)\ ]\begin{bmatrix} W_x(v) \\ W_y(v) \\ W_z(v) \end{bmatrix},$$

$W_l(v)=[W_x(v)\ 0\ 0]$, $L(v)$ being a Fourier transform of function $$\bar{f}\left(\tau - \frac{l_0\sin(\phi)}{\bar{w}}\right)$$

and $$\bar{f}\left(\tau - \frac{l_0\sin(\phi)}{\bar{w}}\right) = \frac{K\sin^2(\phi)}{(\tau\bar{w})^2\Gamma^2},$$

$$\tau = \frac{l\sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, $K$ being a regulation factor, $W_x$, $W_y$, $W_z$ being components of the wind speed at the point of measurement and $\alpha$ being a regularization parameter.

23. A method as claimed in claim 14, wherein a frequency response of the estimator of the wind at the rotor $F(v)$ is written by a relation as follows:

$$F(v) = e^{-2i\pi v \frac{l_0\sin(\phi)}{\bar{w}}} W_l(v) M_R(v)(M_R(v)M_R^T(v) + \alpha^2)^{-1}$$

with $$M_R(v) = L(v)[\ \sin(\phi)\quad \cos(\phi)\sin(\theta)\quad \cos(\phi)\cos(\theta)\ ]\begin{bmatrix} W_x(v) \\ W_y(v) \\ W_z(v) \end{bmatrix},$$

$W_l(v)=[W_x(v)\ 0\ 0]$, $L(v)$ being the Fourier transform of function $$\bar{f}\left(\tau - \frac{l_0\sin(\phi)}{\bar{w}}\right)$$

and $$\bar{f}\left(\tau - \frac{l_0\sin(\phi)}{\bar{w}}\right) = \frac{K\sin^2(\phi)}{(\tau\bar{w})^2\Gamma^2},$$

$$\tau = \frac{l\sin(\phi)}{\bar{w}},$$

$l_0$ being a focal length of the LIDAR sensor, $l$ being a measuring distance, $\theta$ and $\phi$ being orientation angles of the LIDAR sensor, $\bar{w}$ being an average wind speed, $\Gamma$ being a Rayleigh constant, $K$ being a regulation factor, $W_x$, $W_y$, $W_z$ being components of the wind speed at the point of measurement and $\alpha$ being a regularization parameter.

24. A method as claimed in claim 13, comprising constructing the estimator at the rotor by using a windowing method applied to the frequency response of the estimator of the wind at the rotor.

25. A method as claimed in claim 1, wherein the wind propagation is constructed according to at least one of the following hypotheses:
   a wind vector is identical in vertical planes perpendicular to wind direction; and
   wind turbulence propagates at an average wind speed.

26. An offshore wind turbine equipped with a LIDAR sensor including a measuring point located upstream from the turbine, and a control implementing a wind turbine control method comprising:
   a) acquiring a sensor signal corresponding to the measurement performed by the LIDAR sensor;
   b) constructing an estimator for estimating wind speed at the rotor of the turbine from processing the sensor signal using a mathematical representation of the wind, a model of the LIDAR sensor and a model of wind propagation which relates the sensor signal to the wind speed at the rotor;
   c) estimating the wind speed at the rotor of the turbine by applying the sensor signal to the estimator which converts the sensor signal at the point upstream from the rotor into an output signal expressing an estimation of wind speed at a plane of the rotor; and
   d) at least one of controlling and monitoring the wind turbine in response to the estimation of the wind speed at the plane of the rotor.

27. A wind turbine as claimed in claim 26, wherein the LIDAR sensor is located on a nacelle of the turbine.

* * * * *